United States Patent
Ahlborn et al.

(10) Patent No.: US 7,100,587 B2
(45) Date of Patent: Sep. 5, 2006

(54) DEVICE FOR THE VENTILATION OF THE CRANKCASE OF AN INTERNAL COMBUSTION ENGINE

(75) Inventors: Stephan Ahlborn, Senden (DE); Thomas May, Schöppingen (DE); Sieghard Pietschner, Greven (DE)

(73) Assignee: Hengst GmbH & Co. KG, Muenster (DE)

( * ) Notice: Subject to any disclaimer, the term of this patent is extended or adjusted under 35 U.S.C. 154(b) by 248 days.

(21) Appl. No.: 10/469,876

(22) PCT Filed: Mar. 5, 2002

(86) PCT No.: PCT/EP02/02363

§ 371 (c)(1),
(2), (4) Date: Feb. 9, 2004

(87) PCT Pub. No.: WO02/070871

PCT Pub. Date: Sep. 12, 2002

(65) Prior Publication Data

US 2004/0112346 A1    Jun. 17, 2004

(30) Foreign Application Priority Data

Mar. 7, 2001  (DE) .......................... 201 03 874 U
Oct. 27, 2001  (DE) .............................. 101 53 120

(51) Int. Cl.
    *F01M 13/00*  (2006.01)
(52) U.S. Cl. .................................................... 123/572
(58) Field of Classification Search ......... 123/572–574
    See application file for complete search history.

(56) References Cited

U.S. PATENT DOCUMENTS

| | | | | |
|---|---|---|---|---|
| 3,189,012 A | * | 6/1965 | Humphreys ................. 123/574 |
| 4,102,314 A | * | 7/1978 | Sarto ........................... 123/572 |
| 4,557,226 A | * | 12/1985 | Mayer et al. ............. 123/41.86 |
| 4,760,833 A | * | 8/1988 | Tatyrek ....................... 123/574 |
| 4,834,028 A | * | 5/1989 | Oetting .................... 123/41.35 |
| 5,429,101 A | * | 7/1995 | Uebelhoer et al. .......... 123/572 |
| 5,499,616 A | * | 3/1996 | Enright ........................ 123/572 |
| 5,937,837 A | * | 8/1999 | Shaffer et al. .............. 123/573 |
| 2002/0100465 A1 | * | 8/2002 | Pietschner .................. 123/572 |

FOREIGN PATENT DOCUMENTS

DE        3604090 A  *  2/1987
JP       57026218 A  *  2/1982

* cited by examiner

Primary Examiner—Marguerite McMahon
(74) Attorney, Agent, or Firm—Sonnenschein Nath & Rosenthal, LLP

(57) ABSTRACT

The invention relates to a device (1), for the ventilation of the crankcase (20) of an internal combustion engine (2), with a breather tube (3), running from the crankcase (20) to an inlet manifold (22) on the internal combustion engine (2), in the course of which an oil-mist separator (30) is arranged. The novel device is characterized in that in the course of the breather line (3), a pump device is arranged, by means of which a reduced pressure may be generated in the crankcase (20) relative to ambient pressure.

18 Claims, 7 Drawing Sheets

DEVICE FOR THE VENTILATION OF THE CRANKCASE OF AN INTERNAL COMBUSTION ENGINE

BACKGROUND OF THE INVENTION

The present invention relates to an apparatus for ventilating the crankcase of a combustion engine, comprising a vent line running from the crankcase to an intake pipe of the combustion engine and an oil-mist separator that is arranged in the course of the vent line.

An apparatus of the said type is known from the practice of engine construction, in particular for automobiles. This apparatus aims at maintaining in the crankcase of the combustion engine a vacuum pressure that is required for technical and legal reasons by ventilating the crankcase; to achieve this, gases or, in particular, blow-by gases are conducted out of the crankcase or the combustion chambers of the combustion engine to the intake pipe of the engine. Any oil contents carried in the crankcase ventilation gas are separated in an oil-mist separator; preferably, the separated oil is supplied to the lubricating oil circuit of the combustion engine again. The gas that has been freed from the oil enters the intake pipe of the combustion engine and is then running through the combustion that takes place in the engine.

Known apparatuses of the said type have various operational drawbacks that are, in particular, incurred in certain operating states. A drawback of spark-ignition engines is that the drop in pressure above the oil-mist separator is relatively high and causes the danger of an excess pressure developing in the crankcase if the difference between the vacuum pressure in the intake pipe and the atmospheric pressure is inadequate. Moreover, this results in a reduced efficiency of the oil-mist separator because in spark-ignition engines, use is normally made of separators that are operated by the principle of inertia and require a high efficiency to ensure an adequately high volume flow. Another drawback is incurred whenever the combustion engine is in its no-load range because, in this state, the pressure developing in the crankcase may become too high. This problem is, in particular, arising in case of advanced combustion engine wear because this may lead to high blow-by volume flows at high speed and no-load.

For that reason, the present invention aims at creating an apparatus of the aforementioned type, which obviates the drawbacks disclosed and which, in particular, permits to maintain a vacuum pressure in the crankcase of the combustion engine in any and all possible operating states of the combustion engine, with the vacuum pressure being negative in comparison with the atmospheric pressure, and, at the same time, to ensure a high efficiency of the oil-mist separator.

SUMMARY OF THE INVENTION

This problem is solved by the invention by an apparatus of the aforementioned type, characterized in that a pump unit permitting the generation of vacuum pressure in the crankcase as compared with the atmospheric pressure is provided in the course of the vent line.

In case of the apparatus according to the invention, the pump unit ensures, to its advantage, that there is always a desired vacuum pressure in the crankcase of the combustion engine, with this vacuum pressure being maintained even in such operating states of the combustion engine that do not permit generation of the appropriate vacuum pressure only via the intake pipe. At the same time, the pump unit ensures an adequately high volume flow at the crankcase ventilation gas through the oil-mist separator, so that the latter has a high efficiency in any operating state of the combustion engine.

In addition, the invention preferably provides that the pump unit is arranged between the oil-mist separator and the point where the vent line ends in the intake pipe. This arrangement of the pump unit ensures that the oil mist is already separated before the gases are flowing through the pump unit, so that the pump unit cannot be contaminated by any oil mist nor be impaired in its function.

Furthermore, the pump unit is, preferably, a suction pump or an injector. Either pump unit ensures that the desired effects, that is to say the generation of vacuum pressure in the crankcase and the delivery of the crankcase ventilation gases to the intake pipe, are achieved in a reliable manner.

Moreover, the invention proposes that the pump unit is non-power-controlled and that either a pressure regulating valve is arranged in the vent line upstream of the oil-mist separator or a bypass line with controllable opening is conducted out of the vent line downstream of the pump unit and to the crankcase. The technical requirements for this apparatus that comprises a pump unit whose power is not controlled are relatively low so that it can be manufactured at low cost. Since the pump unit itself is not controlled with regard to its power, a different method must be used to ensure that the vacuum pressure developing in the crankcase will not become too high. This is achieved by the optionally provided pressure regulating valve or by the bypass line with controllable opening. Actually, a pressure regulating valve of known design may be used here, because it must only fulfill the requirement of closing the vent line once a specified lower pressure limit has been reached, as is the case with pertinent apparatuses that do not comprise any pump unit.

To realize the aforementioned controllable opening of the bypass line, a regulating valve that is adjustable according to the pressure in the crankcase is, preferably, arranged in this bypass line. This regulating valve can be used to limit the vacuum pressure in the crankcase both upwards and downwards, thus ensuring that a specified range of vacuum pressure is maintained in the crankcase.

To optimize the ventilation of the crankcase and the separation of the oil mist from the crankcase ventilation gas, it is proposed that the regulating valve can, in addition, be adjusted according to the crankshaft speed of the combustion engine and according to the position of a throttle valve, if any is provided in the intake pipe.

Where spark-ignition engines are concerned, a long motor life can only be achieved if any fuel that might have entered the lubricating oil in the oil pan as condensate is quickly and completely discharged therefrom, in order to prevent sludge formation and, thus, any resulting damage to the engine. For such a combustion engine that comprises a throttle valve arranged in the intake pipe, the invention proposes an embodiment of the apparatus where a vent line with check valve is coming out of the intake pipe upstream of the throttle valve and is running into the crankcase. Through this vent line, fresh air can be passed into the crankcase, from where it can be removed together with the other crankcase ventilation gases, after having taken up fuel vapors.

In a further embodiment, the invention proposes that the vent line ends in the intake pipe upstream of the throttle valve and that a branch line comprising a regulating valve in its course branches off from the vent line at a point between the oil-mist separator and the pump unit, with this branch line ending in the intake pipe downstream of the throttle valve. This branch line can be used to ventilate the crankcase as long as there is an adequate vacuum pressure in the intake pipe. The pump unit must only be used for ventilation in those operating states where the vacuum pressure in the intake pipe is inadequate for ventilation of the crankcase.

Appropriately, the regulating valve arranged in the branch line can be adjusted according to the pressure in the crankcase, so as to keep the vacuum pressure in the crankcase within specifiable limits.

To optimize the ventilation of the crankcase and the separation of oil mist from the ventilation gas, the regulating valve arranged in the branch line can, in addition, be adjustable according to the crankshaft speed of the combustion engine and according to the position of the throttle valve.

In certain operating states of a combustion engine, in particular in the idle state of the combustion engine, it is not favorable to supply the crankcase with fresh air because, then, the supplied fresh air might cause unmetered air to be supplied around the throttle valve, thus impairing the idle quality of the combustion engine. To solve this problem, the invention proposes that, in addition to the check valve, a remote-controllable shut-off valve be arranged in the vent line, either separately or in combination with the check valve.

Appropriately, this shut-off valve in the vent line can be adjusted according to the crankshaft speed of the combustion engine; particularly, it can be set to the closed position at idle speed. In the idle state of the combustion engine, this excludes any supply of fresh air through the vent line, past the closed throttle valve and into the intake pipe, thus preventing the idle quality from being impaired.

As an alternative to using a non-power-controlled pump unit, a further embodiment of the apparatus proposes that the power of the pump unit can be controlled according to the pressure in the crankcase. Here, it is appropriate to achieve the control in such a manner that the power of the pump unit is just generating the vacuum pressure desired in the crankcase, wherein the pump power required is dependent on the current operating state and, thus, the respective associated amount of crankcase gases.

In addition, it can be provided that, at a point downstream of the pump unit, a return line is conducted from the vent line to the crankcase, that is to say via a branching valve that can be switched over according to the position of the throttle valve or according to the intake pipe pressure upstream of the throttle valve. Through this return line, crankcase ventilation gas can be returned into the crankcase, unless the intake pipe is able to take up the gas supplied by the pump unit. In this manner, crankcase ventilation gas is reliably prevented from entering the environment through the intake pipe and the air filter in opposition to the flow direction provided.

A further embodiment of the apparatus proposes that the suction pump that forms the pump unit is a radial-flow blower or a side-channel blower with a mechanical drive derived from the combustion engine or with an electric motor as drive. Owing to the fact that the pump power required is only low, the suction pump of the said embodiment may be very compact, thus requiring only little free space. If the suction pump concerned is designed with a mechanical drive derived from the combustion engine, it is appropriate that the suction pump can be driven with a speed whose ratio to the particular crankshaft speed is fixed. In this case, the vacuum pressure in the crankcase is appropriately controlled via the corresponding regulating valves, as has been described above. If the suction pump is provided with an electric motor as drive, control of the vacuum pressure is less restricted.

If the apparatus is provided with an electric motor for driving the suction pump, an electric switch or a voltage regulator is preferably connected in series with the electric motor, with this switch or regulator being adjustable according to the crankcase pressure. This ensures that the suction pump and the electric motor driving it are running only if the pump power is really required, thus reducing the load on the suction pump and the drive motor.

In embodiments of the apparatus with an injector as pump unit, it is provided that the injector can be driven by compressed air from the outlet side of a turbocharger arranged in the course of the intake pipe and forming a part of the combustion engine that is equipped with the apparatus or by compressed air from a compressed air system of a motor vehicle that is equipped with the apparatus. The injector as pump unit has the particular advantage that it does not comprise any moving parts, thus having a practically unlimited service life and being absolutely maintenance-free. Since compressed air is required for operation of the injector, the use of an injector as pump unit is particularly reasonable in apparatuses that are used on combustion engines or in motor vehicles where compressed air is anyhow available, for example by virtue of the aforementioned turbocharger or the compressed air system that is always provided in commercial vehicles.

To ensure that the power of the injector can be controlled as required, it is preferably provided that a regulating valve is incorporated in the compressed air supply line running to the injector, with this regulating valve being adjustable according to the crankcase pressure. The regulating valve will then ensure that the pump power generated by the injector always maintains a vacuum pressure in the crankcase that remains within a specifiable range.

As an alternative to controlling the effective power of the pump unit, a bypass duct can be connected to a regulating valve together with the vent line, with this bypass duct short-circuiting the pump unit and this regulating valve being adjustable according to the crankcase pressure. This ensures that closed-circuit delivery of the ventilation gas through the pump unit and the associated bypass duct can be achieved if required, whereby the effective power of the pump unit can be controlled as desired with regard to the crankcase ventilation gas delivered from the crankcase into the intake pipe. The wider open the regulating valve, the lower the effective power of the pump unit, and vice versa.

To ensure operation of the apparatus with as few own electric and electronic components as possible, the invention finally and preferably proposes that the adjustable and switchable components of the apparatus, that are particularly its valves, can be actuated and monitored by the existing motor electrics associated with the combustion engine. Modern combustion engines are, in general, provided with motor electronics for controlling and regulating operation of the combustion engine, which can also be used for the apparatus according to the invention by expanding its programming and its inputs and outputs to a minor degree only.

BRIEF DESCRIPTION OF THE DRAWING

Exemplary forms of the invention will be described below by means of a drawing, wherein.

Figure 1:
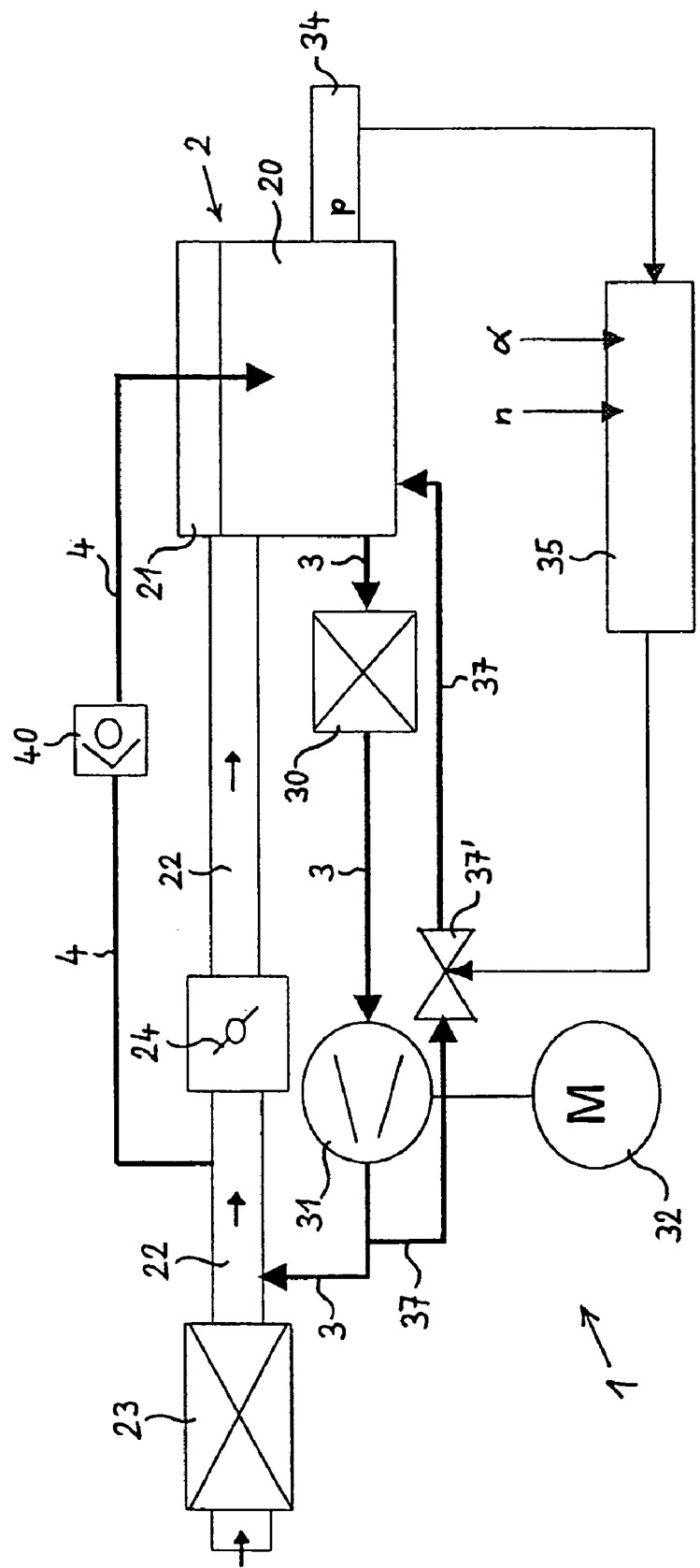
FIG. 1 is a schematic view of an apparatus for ventilation and simultaneous aeration of the crankcase of a combustion engine, preferably an internal combustion engine, in a first embodiment.

At its extreme left, FIG. 1 of the drawing shows an air filter 23, from where an intake pipe 22 is running to the combustion engine 2, which is indicated to the right of FIG. 1. A throttle valve 24 is arranged in the course of the intake pipe 22.

DETAILED DESCRIPTION OF THE PREFERRED EMBODIMENT

A crankcase ventilation line 3 is running from the crankcase 20, that forms a part of the combustion engine 2, to the intake pipe 22, and is ending in the latter upstream of the throttle valve. (Here and below, "upstream" and "downstream" refer to the particular flow direction, as usual.) Initially, an oil-mist separator 30 is arranged in the course of the vent line 3, as viewed in flow direction of the crankcase ventilation gases. The oil-mist separator 30 is preferably provided as a separator that is operated by the principle of inertia, for example a cyclone. Any oil contents that have been separated from the ventilation gas in the separator 30 can be returned to the oil pan in the crankcase 20 via a line that is not shown here. The gases that have been freed from any oil mist are further delivered through the vent line 3 and to a pump unit 31, here a suction pump drivable by an electric motor 32, whose outlet is connected to the intake pipe 22 upstream of the throttle valve 24. In the embodiment shown here, the pump unit 31 has a permanent drive, that is to say its pump power is constant. In order to be able to adjust the volume of the crankcase ventilation gas delivered to the intake pipe 22 as required, a bypass line 37 is, in addition, connected to the outlet of the pump unit 31, with the bypass line 37 being returned to the crankcase 20. The bypass line 37 is provided with an adjustable opening that can, here, be adjusted by means of a regulating valve 37'.

Here, the regulating valve 37', which is arranged in the bypass line 37, is adjusted via a regulator 35, which is, appropriately, a part of the existing motor electrics or electronics of the associated combustion engine 2, wherein the motor electrics or electronics receive control signals via corresponding sensors, such as, via the pressure sensor 34, the pressure p inside the crankcase 20, the crankshaft speed n of the combustion engine and the position a of the throttle valve 24. Using these measured values and according to a specifiable characteristic map or program, the regulator 35 calculates control signals for the regulating valve 37' that is arranged in the bypass line and adjusts the flow area of the regulating valve 37' according to the particular operating states of the combustion engine 2 such that the vacuum pressure in the crankcase 20 remains within specifiable limit values.

A vent line 4, that branches off from the intake pipe 22 upstream of the throttle valve 24 and ends in the crankcase 20, is provided for ventilation of the crankcase 20. A check valve 40, that permits a flow direction only from the intake pipe 22 to the crankcase 20, is arranged in the course of the vent line 4.

During operation of this apparatus 1, the regulating valve 37' in the bypass line 37 is adjusted such that a vacuum pressure of a specified value is always maintained in the crankcase 20. In this embodiment, the apparatus 1 has the advantage that its design is relatively simple; on the other hand, the pump unit 31, owing to its permanent operation, is subject to increased wear so that a construction with a correspondingly long life must be selected in this case. To ensure proper functioning of this apparatus 1, it is irrelevant whether a throttle valve 24 is arranged in the intake pipe 22 or not; hence, this embodiment of the apparatus 1 is suitable for all internal combustion engines with or without throttle valve 24. This apparatus 1 is even suitable for supercharged engines. In addition to maintaining the desired vacuum pressure in the crankcase 20, the pump unit 31 ensures that the volume flow through the oil-mist separator 30 is always sufficiently high, so that the latter permanently achieves its optimum efficiency.

In case of this apparatus 1, any supply of unmetered air to the combustion chambers 21 of the combustion engine 2 around the throttle valve 24 is excluded, thus preventing any disturbances in the idle state.

Figure 2:
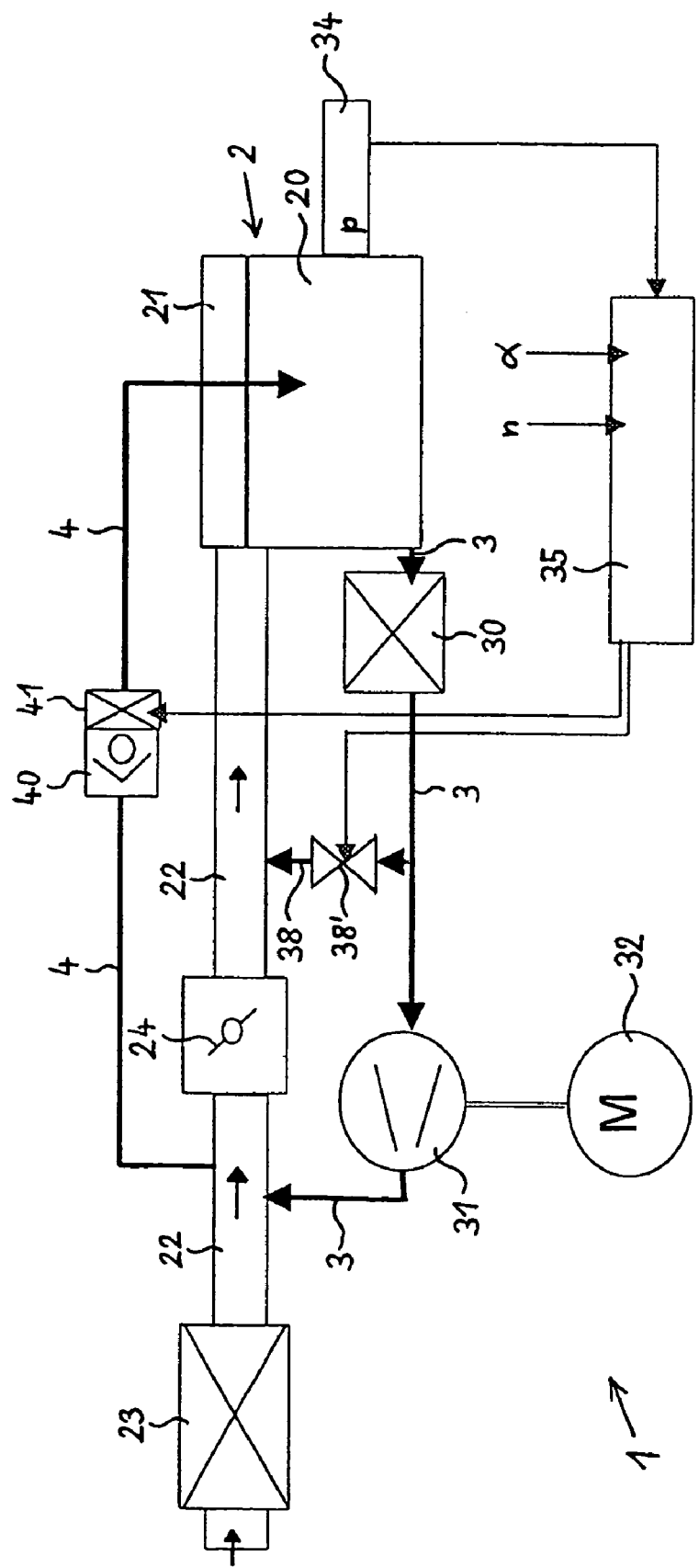
FIG. 2 is the same view of the apparatus in a second embodiment.

The embodiment of the apparatus 1 illustrated in FIG. 2 of the drawing is different from the apparatus 1 according to FIG. 1 in that:

The bypass line 37 running from the pump 31 to the crankcase 20 in the first embodiment of the apparatus 1 is not applicable; instead, a branch line 38 branches off from the vent line 3 to the pump unit 31 at a point upstream of the oil-mist separator 30 and, via a regulating valve 38', ends in the intake pipe 22 at a point downstream of the throttle valve 24. A further difference is that, in this case, the check valve 40 in the vent line 4 is combined with a remote-controllable shut-off valve 41.

In its remaining parts, the apparatus according to FIG. 2 is identical with the embodiment shown in FIG. 1.

The regulating valve 38' in the branch line 38 running from the outlet of the oil-mist separator 30 to the intake pipe 22 downstream of the throttle valve 24 is adjusted by the regulator 35 according to the pressure p in the crankcase, the crankshaft speed n and the throttle valve position α. Herein, the position of the valve 38' is adjusted such that the valve 38' is in the open position when the vacuum pressure in the intake pipe 22 is adequate. In this case, the crankcase is, in substance, ventilated via the vacuum pressure present in the intake pipe 22. If the vacuum pressure in the intake pipe 22 is not sufficient for maintaining an adequate vacuum pressure in the crankcase 20, the regulating valve 38' is closed and the vacuum pressure in the crankcase 20 is adjusted via the pump unit 31.

Moreover, the shut-off valve 41 in the vent line 4 is closed when the combustion engine 2 is in the idle state so that, in this operating state of the combustion engine 2, unmetered air is prevented from passing the throttle valve 24. In this embodiment of the apparatus 1 as well, the vacuum pressure required in the crankcase 20 is maintained in all operating states of the combustion engine 2. At the same time, first-rate oil separation is ensured in the oil-mist separator 30 because the volume flow in the latter is always adequate. Furthermore, smooth idle run of the combustion engine 2 is ensured, without any disturbances caused by unmetered air.

Figure 3:
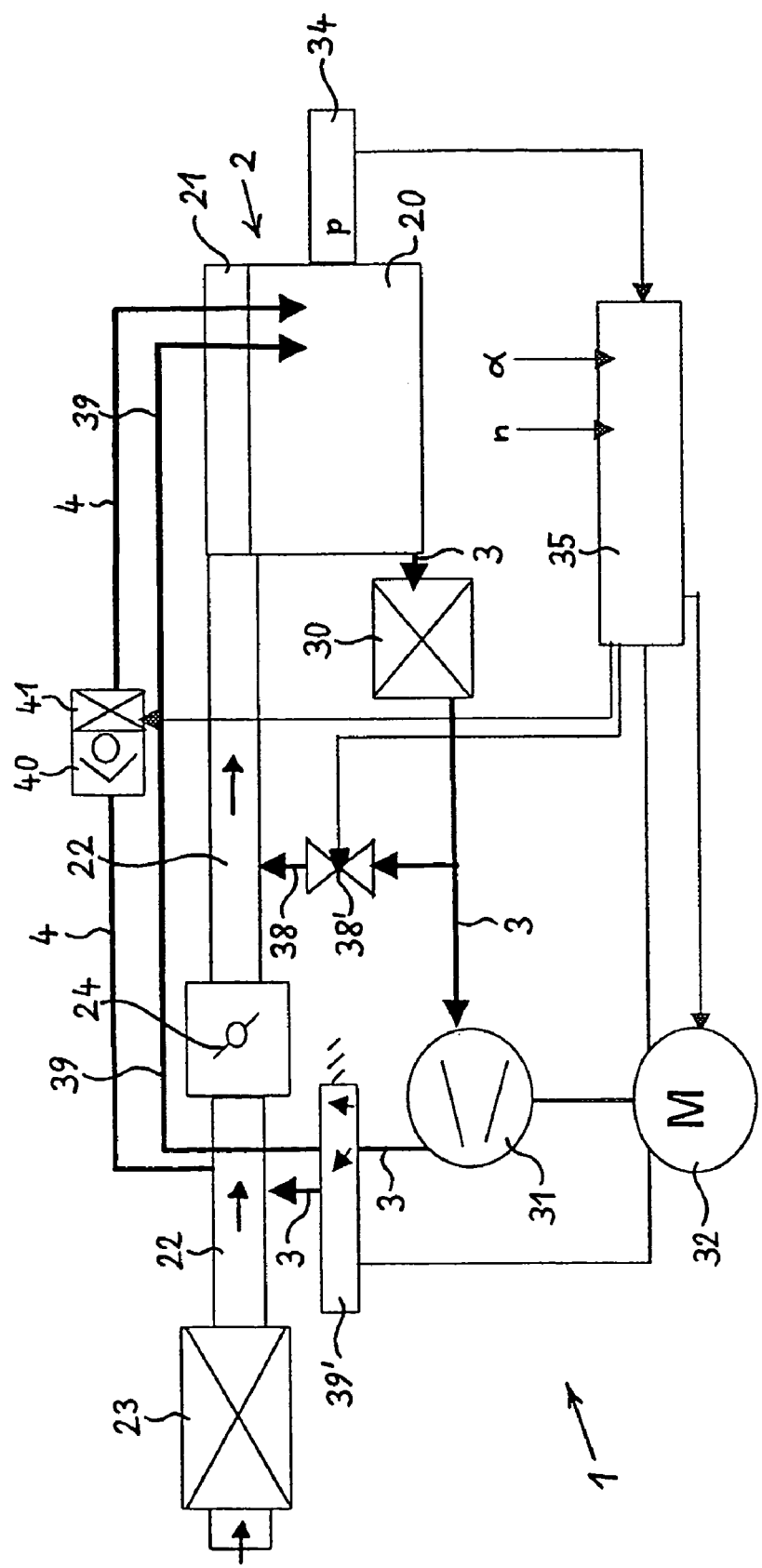
FIG. 3 is also the same view of the apparatus in a third embodiment.

FIG. 3 of the drawing shows a third embodiment of the apparatus 1, differing from the embodiment according to FIG. 2 in two additional elements. These additional elements are, on the one hand, a branching valve 39' that is incorporated downstream of the pump unit 31 in that section of the vent line 3 that is running to the intake pipe 22. A return line 39 is running from the branch outlet of the branching valve 39' to the crankcase 20.

The second additional element is the fact that, in this embodiment, the pump unit 31 is power-controlled. To achieve this, the regulator 35 is likewise designed as an electric switch or voltage regulator that is adjusted according to the pressure p in the crankcase, the crankshaft speed n and the throttle valve position α. The regulator 35 acts upon the performance of the engine in a controlling manner, thus regulating the power of the pump unit 31.

In its basic operating state, the apparatus 1 according to FIG. 3 is operated in the same ways as is the apparatus 1 according to FIG. 2. Additionally, in the apparatus 1 according to FIG. 3 the outlet of the pump unit 31 can, instead of being connected to the intake pipe 22 upstream of the throttle valve 24, alternatively be connected via the branching valve 39' and the return line 39 to the crankcase. This provides the possibility that, if the volume of crankcase ventilation gas delivered by the pump unit 31 cannot be taken up by the intake pipe 22 upstream of the throttle valve 24, the crankcase ventilation gas is delivered in recirculation between the crankcase 20 and the pump unit 31. This case can be determined by measuring the pressure in the intake pipe 22 or by evaluating the parameters that are anyhow registered, such as the throttle valve position α, the pressure p in the crankcase and the crankshaft speed n. In this manner, the crankcase ventilation gas is prevented from entering the environment through the air filter 23, in opposition to the flow direction provided in the intake pipe 22. Since operating states of the combustion engine 2 where this working method of the apparatus 1 is incurred are only rare, this additional operating mode does not cause any noticeable additional load.

By readjusting the power of the pump unit 31, the vacuum pressure in the crankcase 20 can be set to the appropriate value. As long as the vacuum pressure present in the intake pipe 22 is adequate, it is even possible to turn off the pump unit 31.

Figure 4:
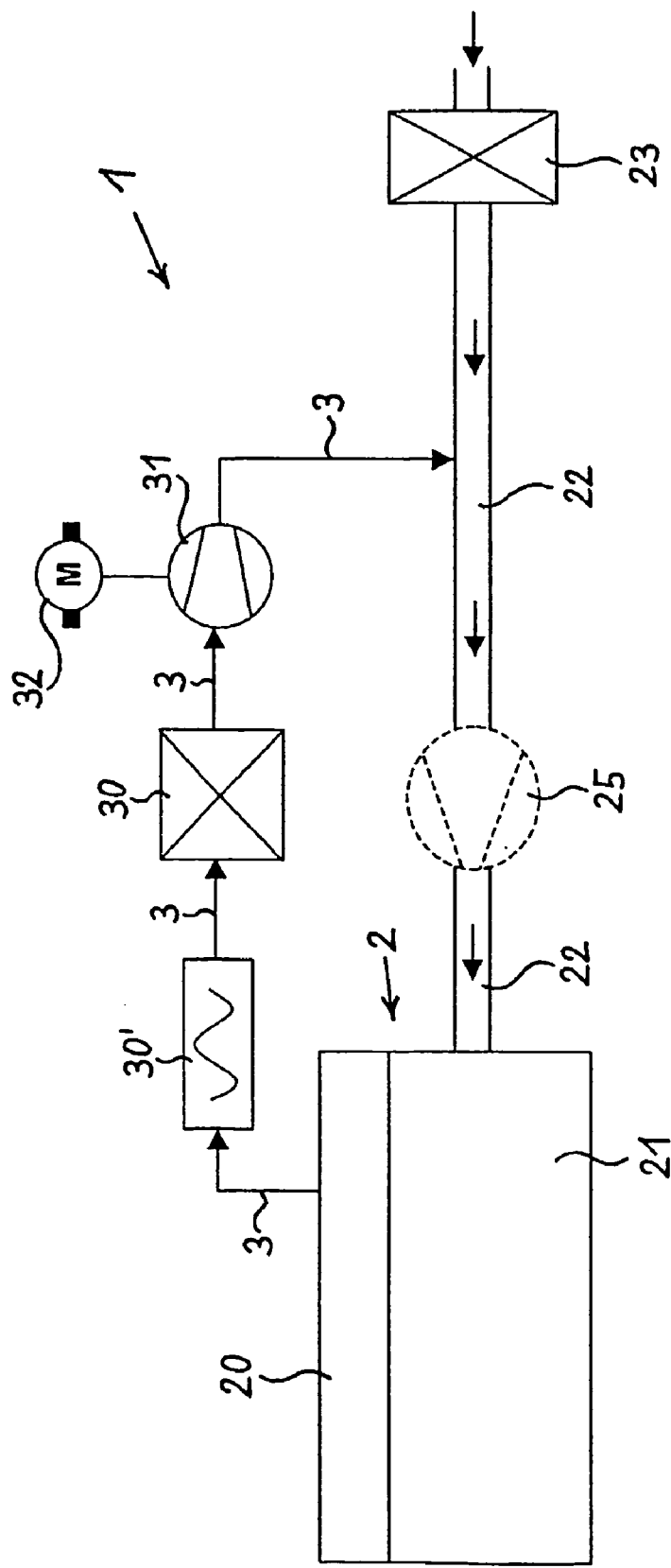
FIG. 4 is a schematic view of an apparatus for ventilating the crankcase of a combustion engine, preferably a Diesel engine, in a first embodiment.

FIG. 4 of the drawing shows an apparatus 1 for ventilating the crankcase 20 of a combustion engine 2, wherein this apparatus 1 is, to its advantage, combined with a combustion engine 2 that is designed as a Diesel engine. Here as well, the combustion engine 2 is provided with an intake pipe 22, in the course of which an air filter 23 is arranged. A throttle valve, as it is provided in the embodiment shown in FIGS. 1 to 2, is not provided here. Furthermore, a turbocharger 26 may be provided in the course of the intake pipe 22; this, however, is not essential for the apparatus 1 according to FIG. 4 to function properly. Here as well, a vent line 3 that is running from the crankcase 20 to the intake pipe 22 downstream of the air filter 23 is provided for ventilation of the crankcase 20 of the combustion engine 2. As usual, an oil-mist separator 30 is incorporated in the course of the vent line 3 here as well. A pump unit 31 that is, in this case, formed by a suction pump and can be driven via an electric motor 32 is provided downstream of the oil-mist separator 30, as viewed in flow direction. Here, the motor 32 is designed without power control, so that the pump unit 31 is always operated with a constant driving power. In order to exclude that the permanently operated pump unit 31 causes a vacuum pressure in the crankcase 20 that is too high, a normal pressure regulating valve 30' is incorporated in the course of the vent line 3, between the crankcase 20 and the oil-mist separator 30. This pressure regulating valve 30' is operated in the known manner, that is to say such that the flow area of the vent line 3 is reduced or completely closed once the pressure in the crankcase 20 reaches a lower limit value. Only if the pressure in the crankcase 20 is rising again will the pressure regulating valve 30' open the ventilation duct 3 so that, then, the crankcase ventilation gas is discharged again. The pump power of the pump unit 31 must be rated such that discharge of the crankcase ventilation gas is ensured without the risk that an excess pressure might be developing, even if the crankcase ventilation incurred is at its maximum and the intake vacuum is at its minimum. Since it does not require any active regulating elements whatsoever, the apparatus 1 according to FIG. 4 is characterized by a particularly simple design. The drive motor 32 of the pump unit 31 is operated with constant power and is supplied from the electric supply system of the combustion engine or of the associated motor vehicle, as soon as the combustion engine 2 is in the operating state. As an alternative, it is also possible to simply derive the drive from the combustion engine in a mechanical manner. The pressure regulating valve 30' is also operated absolutely automatically and in particular without any external regulators or energy sources, so that, here as well, a simple technical solution and a simple mode of operation have been achieved.

Figure 5:
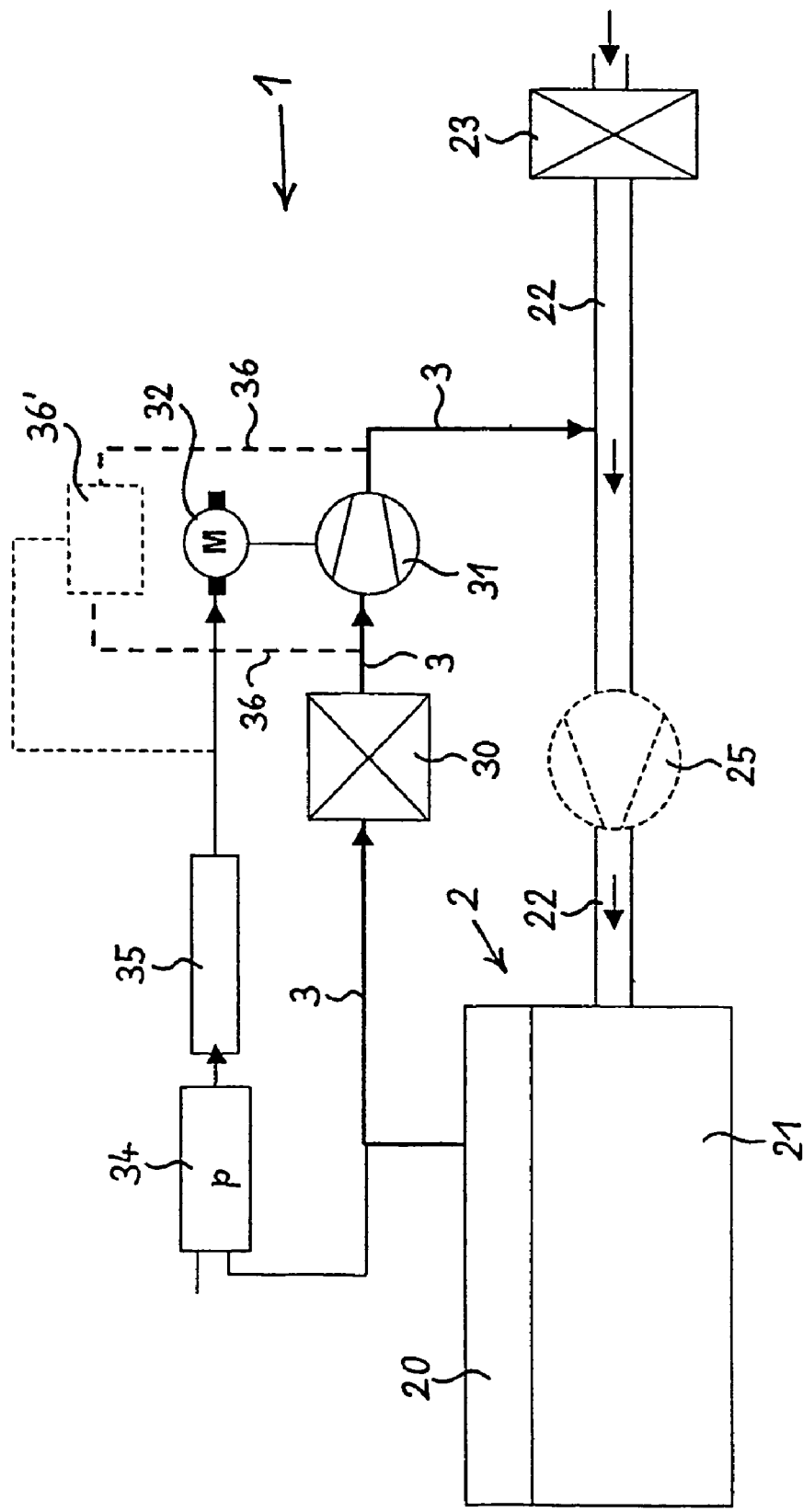
FIG. 5 is the same view of the apparatus according to FIG. 4 in a second embodiment.

FIG. 5 of the drawing shows a variation of the apparatus 1 according to FIG. 4 that is different from the apparatus 1 according to FIG. 4, in that the power of the pump unit 31 can be altered. This alteration of the power of the pump unit 31 can be achieved in two different ways. The first way, which is represented by solid lines in FIG. 5, provides a pressure sensor 34 that registers the pressure p in the crankcase 20 of the combustion engine 2 in comparison with the environment and supplies a signal corresponding to the pressure p to a regulator 35. The regulator 35 is an electric switch or voltage regulator whose output is connected to the drive motor 32 and either activates or deactivates the latter or, by changing the supply voltage, takes an effect on the performance of the motor. As a result, the pump power of the pump unit 31 is changed accordingly and is controlled as required, so that the pressure p in the crankcase 20 remains within the limits specified.

The alternative possibility of taking effect on the pump power of the pump unit 31 is represented by broken lines and provides a bypass line 36 that is connected to the vent line 3, with the bypass line 36 bypassing the pump unit 31. A regulating valve 36' is incorporated in the course of the bypass line that is now supplied with control signals from the regulator 35 instead of the drive motor 32. If the regulating valve 36' is open, the pump unit 31 is short-circuited, so that gas is practically only delivered in recirculation through the pump unit 31 and the bypass line 36, whereby the effective pump power of the pump unit 31 is reduced to a minimum with regard to the crankcase ventilation gas delivered from the crankcase 20 into the intake pipe 22. The more the regulating valve 36' is closed, the larger the effective pump power of the pump unit 31 with regard to the delivery of crankcase ventilation gas from the crankcase 20 into the intake pipe 22.

Here as well, the oil-mist separator 30 is arranged upstream of the pump unit 31, in order to keep oil mist that might be detrimental to the function of the pump unit 31 away from the latter. Finally, it is also possible in the apparatus 1 according to FIG. 5 to provide an optional turbocharger 25 in the intake pipe 22, with the turbocharger 25 neither having any effect on the function of the apparatus 1.

Figure 6:
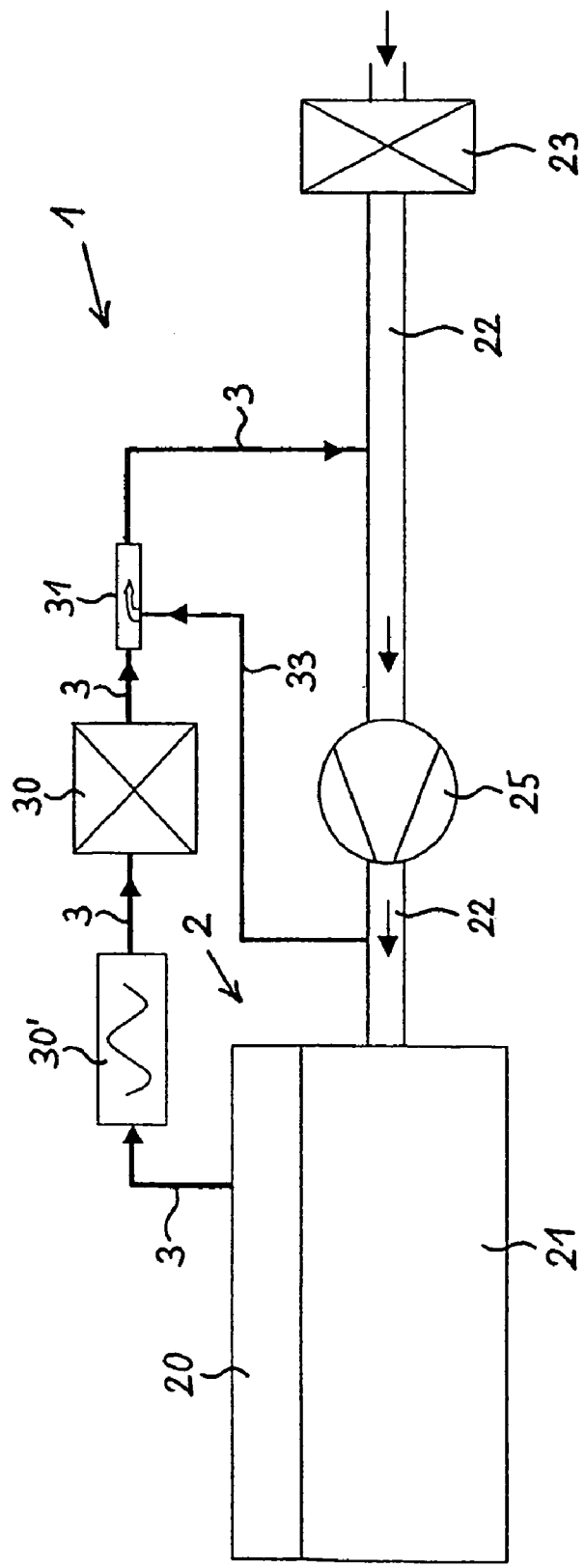
FIG. 6 is the same view of the apparatus according to FIG. 4 in a third embodiment.

FIG. 6 of the drawing shows an embodiment of the apparatus 1 that is provided with an injector as pump unit 31 instead of a suction pump. The injector 31 is incorporated in the vent line 3 at the same point where the suction pump is arranged as pump unit 31 in the apparatus 1 according to FIGS. 4 and 5. The compressed air required for operation of the injector 31 is supplied to the injector 31 through a compressed air line 33. This compressed air line 33 branches off from the intake pipe 22 on the outlet side of the turbocharger 25 that is provided obligatorily in this case. Since the injector 31 has to generate only a relatively low pump power, only a very small portion of the charge air compressed by the turbocharger 25 is diverted through the compressed air line 33 for operation of the injector 31; in practice, this portion amounts to approximately a quarter of a percent of the entire charge air volume.

In its remaining parts, the apparatus 1 according to FIG. 6 is identical with the apparatus according to FIG. 4; as regards the function of the apparatus 1 according to FIG. 6, reference is made to the corresponding passages in the description of FIG. 4.

Figure 7:
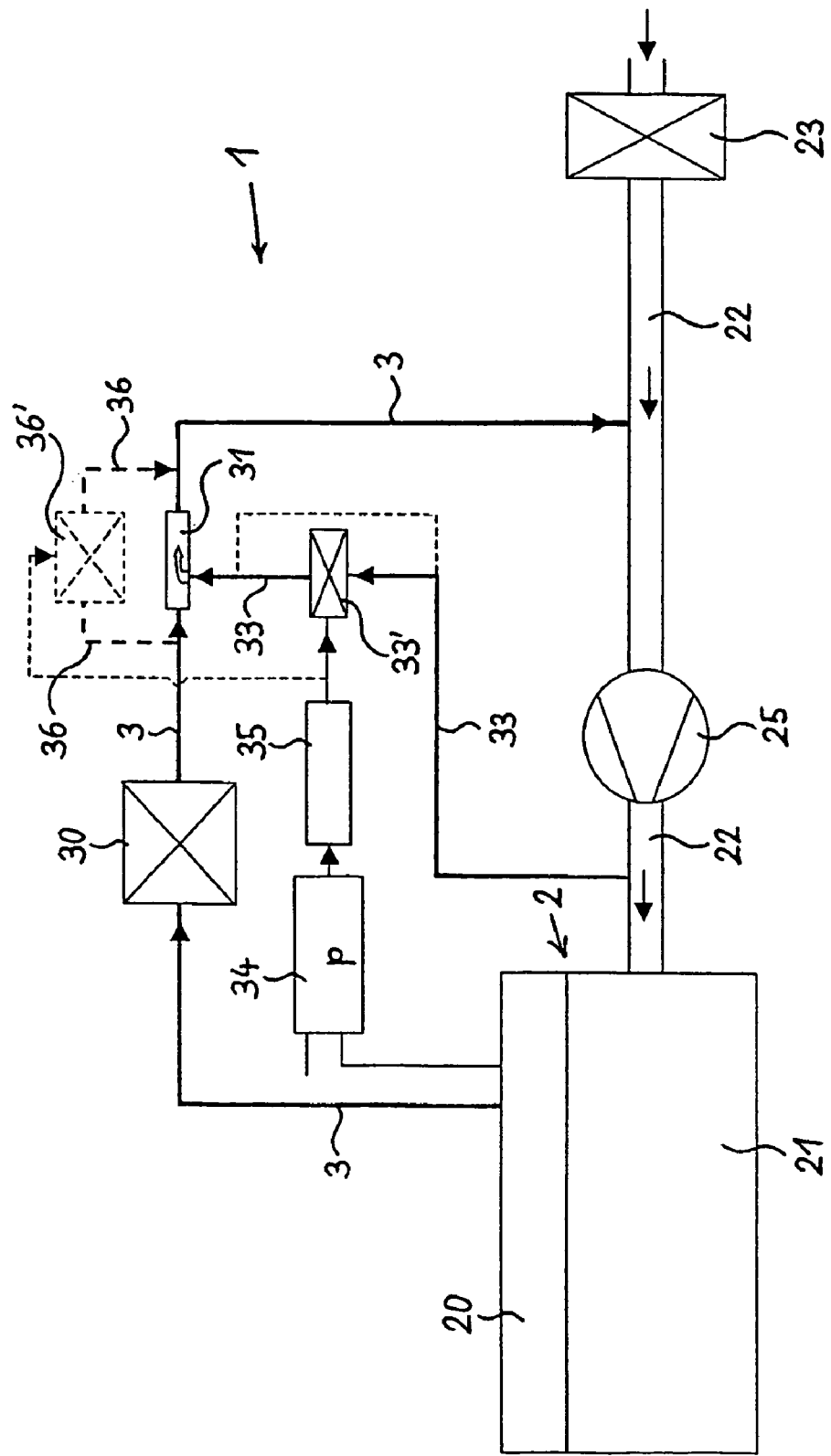
FIG. 7 is also the same view of the apparatus according to FIG. 4 in a fourth embodiment.

As a final point, FIG. 7 of the drawing shows an embodiment of the apparatus 1 that is, in substance, identical with the apparatus 1 according to FIG. 5, and is different in that an injector is provided as pump unit 31 instead of the suction pump in the apparatus 1 according to FIG. 7. In analogy to the apparatus 1 according to FIG. 5, the pump power of the injector 31 in the apparatus 1 according to FIG. 7 is also controllable. Here as well, there are two preferred ways of control. The first way that is represented by solid lines provides that the volume of the compressed air supplied to the injector 31 through the compressed air line 33 is controlled by a regulating valve 33' incorporated in the line 33, according to the pressure p present in the crankcase 20. To achieve this, the pressure p in the crankcase 20 is registered by a pressure sensor 34 and transmitted to the regulator 35 as measurement signal, with the regulator 35 adjusting the regulating valve 33' as required. As a result, the compressed air volume supplied to the injector 31 is always such that the pump effect generated by the injector 31 ensures a vacuum pressure p in the crankcase 20 ranging within specifiable limits. Here as well, the compressed air required for generation of the pump effect of the injector 31 is taken from the intake pipe 22 downstream of the turbocharger 25.

As an alternative, the compressed air required for operation of the injector 31 can also be taken from a compressed air system, that is part of a motor vehicle not shown in the drawings, in particular of a commercial vehicle, provided with a combustion engine 2 and an apparatus 1.

The alternative possibility of taking effect on the pump power of the injector 31 that is represented by broken lines provides that the crankcase gas is enabled to flow through the bypass line 36 via the regulating valve 36', whereby the injector 31 is short-circuited either as a whole or in part. The regulator 35 then acts upon the regulating valve 36' in the bypass line 36; the regulating valve 33' in the compressed air line 33 is not required any longer. In its mode of operation, the apparatus 1 according to FIG. 7 is, otherwise, identical with the apparatus 1 according to FIG. 5; reference is made to the corresponding passages in the description of FIG. 5.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. An apparatus for ventilating a crankcase of a combustion engine, comprising a vent line running from the crankcase to an intake pipe of the combustion engine, with an oil-mist separator being arranged in the course of the vent line, wherein a pump unit is provided in the course of the vent line, with the pump unit being able to generate a vacuum pressure in the crankcase that is negative in comparison with atmospheric pressure, and a bypass line with a controllable opening is conducted out of the vent line downstream of the pump unit and to the crankcase.

2. The apparatus according to claim 1, wherein a regulating valve is arranged in the bypass line and wherein this regulating valve can be adjusted according to the pressure in the crankcase.

3. The apparatus according to claim 2, wherein the regulating valve can, in addition, be adjusted according to a crankshaft speed (n) of the combustion engine and according to a position ($\alpha$) of throttle valve, if any is provided in the intake pipe.

4. The apparatus according to claim 1, wherein a throttle valve is arranged in the intake pipe, wherein a vent line with a check valve branches off from the intake pipe upstream of the throttle valve and runs into the crankcase.

5. The apparatus according to claim 4, wherein the vent line ends in the intake pipe upstream of the throttle valve and a branch line provided with a regulating valve in its course branches off from the vent line between the oil-mist separator and the pump unit and ends in the intake pipe downstream of the throttle valve.

6. The apparatus according to claim 5, wherein the regulating valve that is arranged in the branch line can be adjusted according to a pressure (p) in the crankcase.

7. The apparatus according to claim 6, wherein the regulating valve can, in addition, be adjusted according to a crankshaft speed (n) of the combustion engine and according to a position ($\alpha$) of the throttle valve.

8. The apparatus according to claim 5, wherein a remote-controllable shut-off valve is arranged in the vent line in addition to the check valve.

9. The apparatus according to claim 8, wherein the shut-off valve in the vent line can be adjusted according to a crankshaft speed (n) of the combustion engine and can, particularly, be set to a closed position at idle speed.

10. The apparatus according to claim 5, wherein a return line is conducted from the vent line downstream of the pump unit and to the crankcase via a branching valve that can be switched over according to a throttle valve position ($\alpha$) or according to an intake pressure upstream of the throttle valve.

11. The apparatus according to claim 4, wherein the pump unit is arranged between the oil-mist separator and the point where the vent line ends in the intake pipe.

12. The apparatus according to claim 1, wherein the pump unit is one of a suction pump and an injector.

13. The apparatus according to claim 12, wherein the suction pump that forms the pump unit is one of a radial-flow blower and a side-channel blower with one of an electric motor drive and a mechanical drive derived from the combustion engine.

14. The apparatus according to claim 13, wherein one of an electric switch and voltage regulator is connected in series with the electric motor driving the suction pump, with this switch or regulator being adjustable according to a crankcase pressure (p).

15. The apparatus according to claim 12, wherein the injector forming the pump unit can be driven by one of compressed air from one of the outlet side of a turbocharger arranged in the course of the intake pipe and forming a part of the combustion engine that is equipped with the apparatus and by compressed air from a compressed air system of a motor vehicle that is equipped with the apparatus.

16. The apparatus according to claim 15, wherein that a regulating valve is incorporated in a compressed air supply line running to the injector, wherein the regulating valve can be adjusted according to a crankcase pressure (p).

17. The apparatus according to claim 13, including a vent line that branches off from the intake pipe upstream of the throttle valve and runs into the crankcase and wherein a bypass duct with a regulating valve is connected to the vent line, wherein this bypass duct short-circuits the pump unit and this regulating valve can be adjusted according to a crankcase pressure (p).

18. The apparatus according to claim 1, wherein adjustable and switchable components of the apparatus can be actuated and monitored by one of existing motor electrics and motor electronics associated with the combustion engine.

* * * * *